United States Patent [19]
Shelton

[11] 3,813,789
[45] June 4, 1974

[54] MEASURING APPARATUS

[75] Inventor: Russell S. Shelton, Paducah, Ky.

[73] Assignee: Shelton Metrology Laboratory, Inc., Paducah, Ky.

[22] Filed: June 26, 1967

[21] Appl. No.: 648,805

[52] U.S. Cl.......... 33/174 L, 33/169 R, 33/174 TA, 33/DIG. 2, 308/5 R, 308/9, 308/DIG. 1
[51] Int. Cl.............................................. G01b 5/02
[58] Field of Search.......... 33/169 A, 174 A, 174 E, 33/174 H, 174 P, 174 TA, 174 TD, 125, 174 L, DIG. 2; 73/37.5, 1 D, 1 E; 308/3, DIG. 1

[56] References Cited
UNITED STATES PATENTS

| | | | |
|---|---|---|---|
| 2,410,877 | 11/1946 | Hall | 33/174 H |
| 2,683,635 | 7/1954 | Wilcox | 308/DIG. 1 |
| 2,807,883 | 10/1957 | Mayne | 33/174 H |
| 2,885,915 | 5/1959 | Schurger | 308/DIG. 1 |
| 3,069,778 | 12/1962 | Schiler | 33/174 |
| 3,104,496 | 9/1963 | Macks | 308/DIG. 1 |
| 3,203,224 | 8/1965 | Aske | 73/1 |
| 3,237,312 | 3/1966 | Boppel | 33/174 L |
| 3,286,353 | 11/1966 | Potter | 33/174 |
| 3,289,298 | 12/1966 | Standridge | 33/1 |
| 3,377,713 | 4/1968 | Schiler | 33/174 A |
| 3,364,728 | 1/1968 | Albertson | 73/37.5 |
| 3,384,970 | 5/1968 | Avalear | 33/189 |
| 3,393,648 | 7/1968 | Diehy | 108/102 |

FOREIGN PATENTS OR APPLICATIONS

| | | | |
|---|---|---|---|
| 727,867 | 2/1966 | Canada | 33/174 L |

Primary Examiner—William D. Martin, Jr.
Attorney, Agent, or Firm—Browne, Beveridge, DeGrandi & Kline

[57] ABSTRACT

Measuring apparatus employing an accurate planar reference surface of granite has a movable probe and a movable workpiece, both of which have their movements guided by and related directly to the reference surface. The movable members are supported on air bearings which have regulatable air supplies to permit accurate calibration and adjustment of the apparatus. Electronic scales measure the displacement of the movable elements along their paths of movement.

The probes operate optically or by contact with a workpiece. The contact probe is mounted directly on the optical probe and has its contacting point lying on the line-of-sight of the optical probe.

A rotary work-supporting table has air bearings rotatable therewith so that it may be rotated without affecting its parallelism with the underlying reference surface.

The movable elements are positively driven by hydraulic rams which receive hydraulic fluid from a hydro-pneumatic system involving reservoirs connectable with low pressure air or high pressure air. Metering valves control the flow of hydraulic fluid to and from the reservoirs.

26 Claims, 35 Drawing Figures

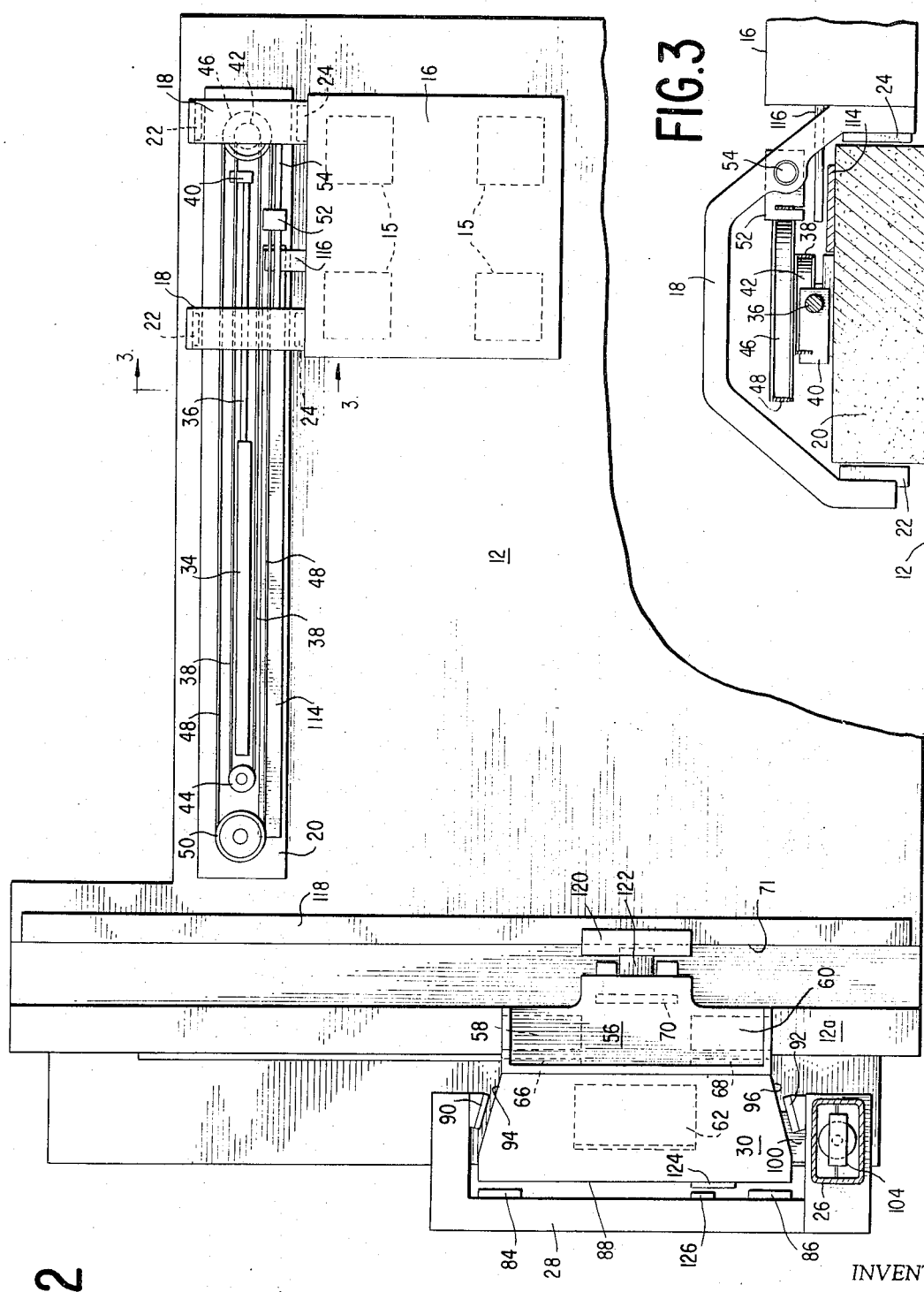

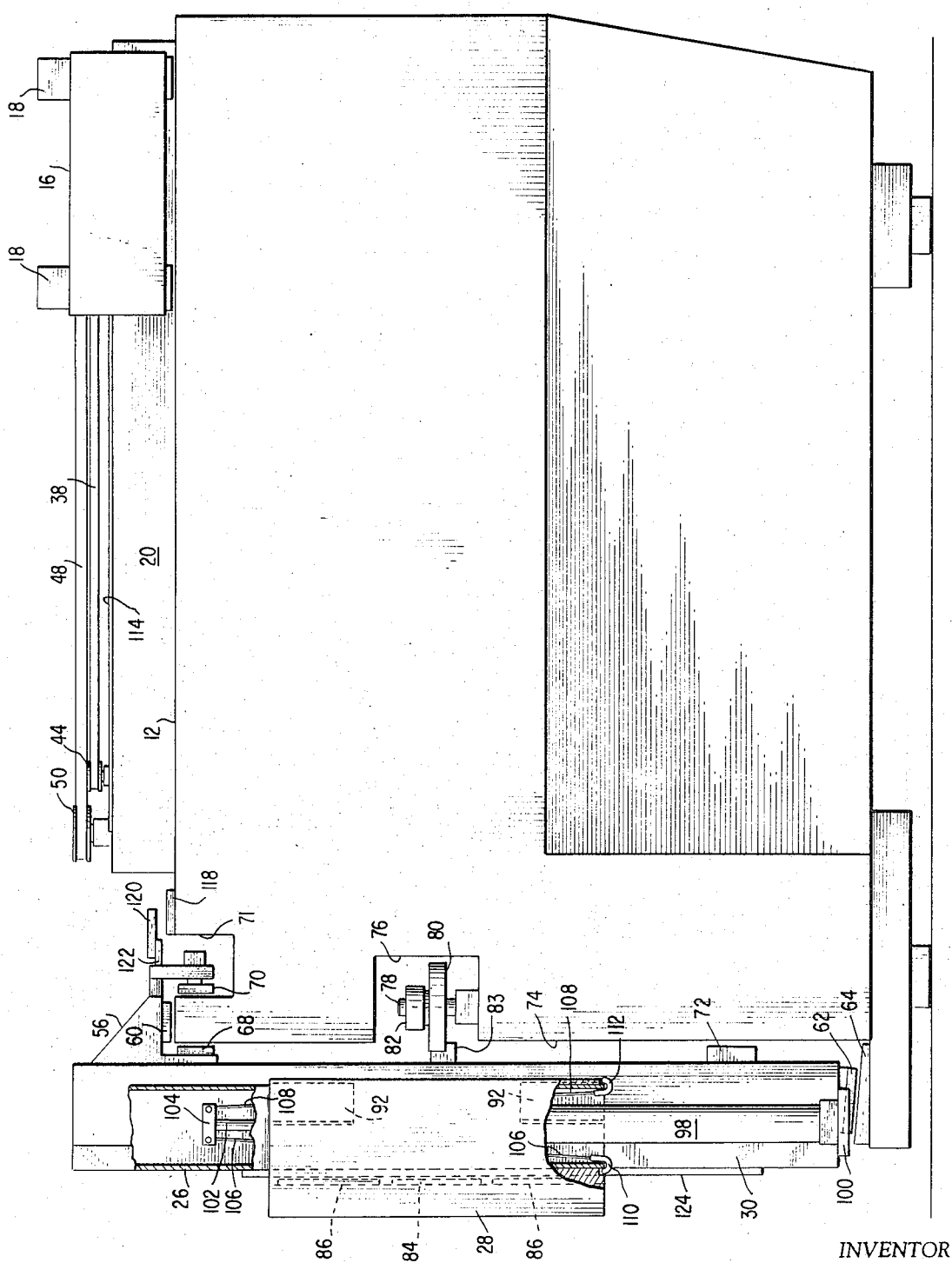

INVENTOR
RUSSELL S. SHELTON

BY Browne, Schuyler & Beveridge

ATTORNEYS

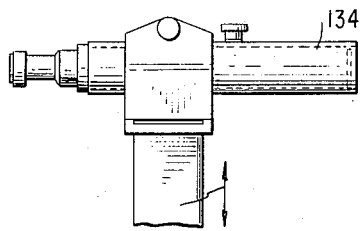
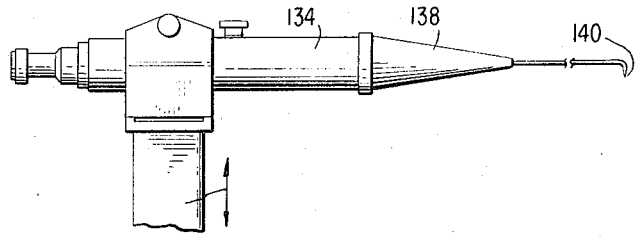
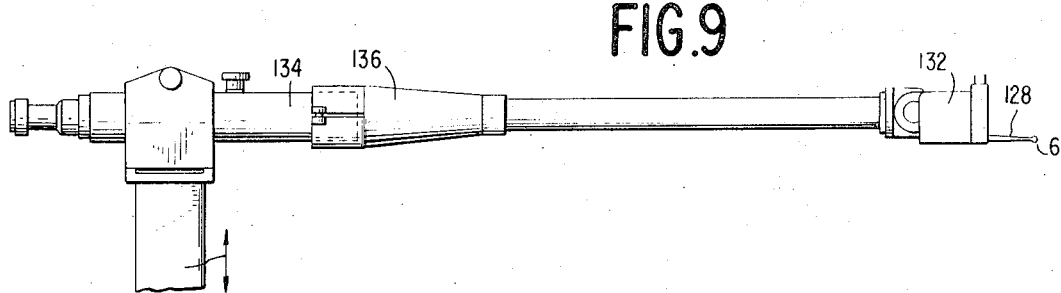
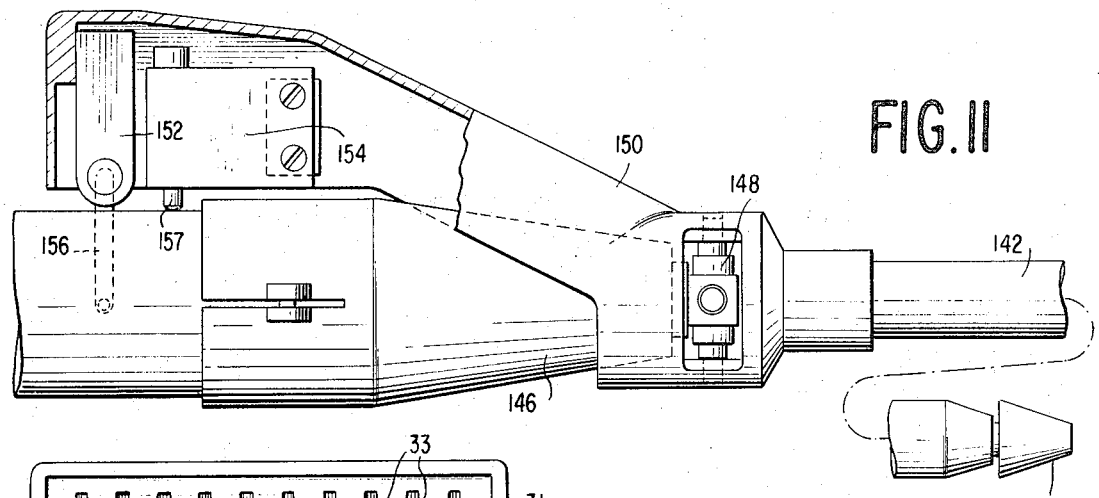
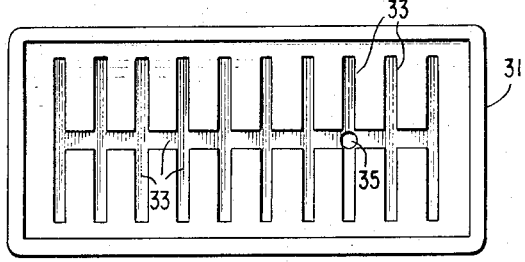
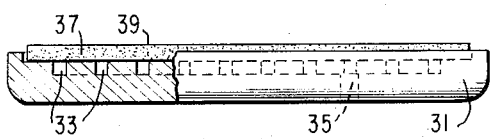

INVENTOR
RUSSELL S. SHELTON

BY Browne, Schuyler & Beveridge

ATTORNEYS

INVENTOR
RUSSELL S. SHELTON
BY Browne, Schuyler & Beveridge
ATTORNEYS

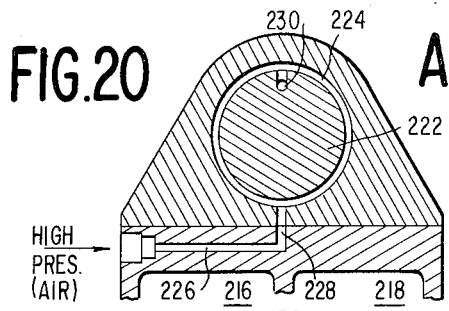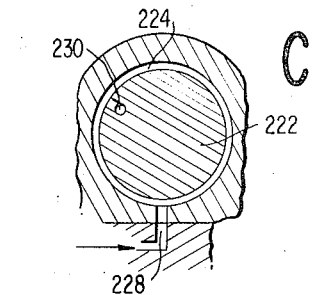
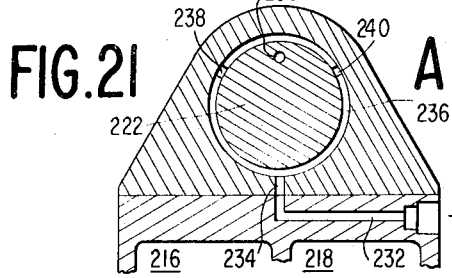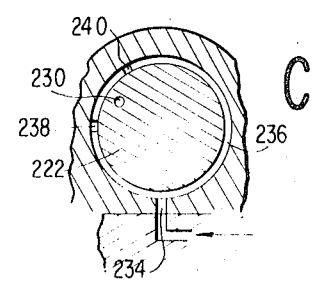
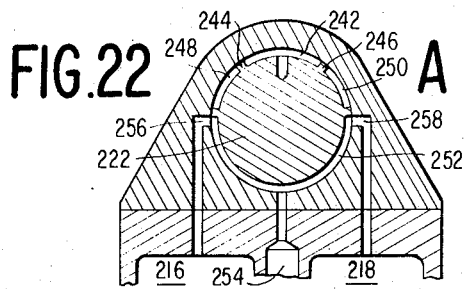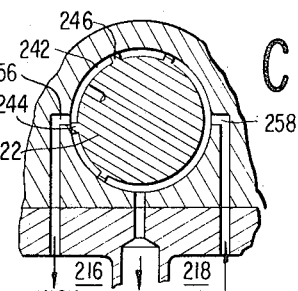
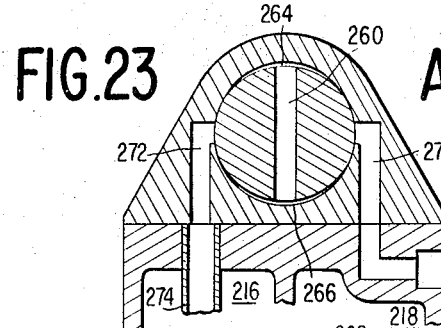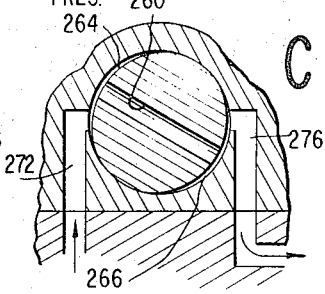
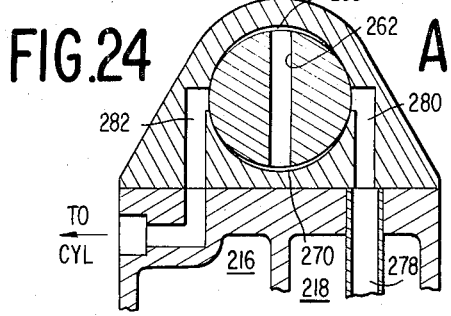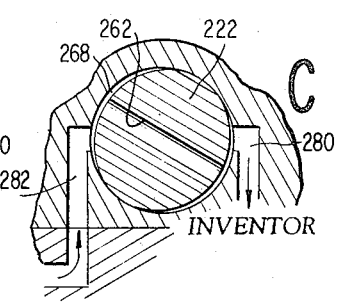

MEASURING APPARATUS

This invention relates to measuring apparatus of the type in which relative movement between a probe and a workpiece is measured to determine the dimensions of the workpiece. The invention also pertains to various adjuncts which are useful with such apparatus.

Modern technology has created a significant demand for instruments capable of measuring linear dimensions of articles to an accuracy within 50-millionths of an inch or less. Although instrument manufacturers have devised apparatus capable of measuring to such a high degree of accuracy, most of these instruments have been complicated and have been manufactured on a custom basis, therefore rendering them prohibitively expensive for many manufacturers who have a need for such equipment. Furthermore, many of these instruments are designed for a very specific purpose and for measurement of dimensions within a relatively narrow range, so they lack the flexibility of operation which is most desirable in apparatus of this type.

The apparatus of this invention has for an ancestor the granite measuring tables which have been used for determining the height of articles supported thereon. This early device involved a movable probe which was supported directly on the table by a standard and which was vertically adjustable to positions where it would touch an upper surface of the article. A visual scale on the standard would indicate the location of the probe and the vertical dimension of the article.

A measuring table and probe such as the one described above has several disadvantages which are eliminated by the present invention. Of course, the use of a visual scale does not permit highly accurate readings. Even if the scale were more accurate, there would continue to be substantial errors. Movement of the standard over the surface of the table would abrade and destroy the accuracy and planar nature of the work supporting surface. When the standard rested on small fissures in the granite, the readings were affected. Another limitation of this prior art apparatus is that it was capable of measuring only those dimensions which were perpendicular to the table.

More recently, there have been measuring instruments in which a probe is movable along plural mutually parallel axes into alignment with an article on a table. Means are provided for indicating the position of the probe along the axes. This apparatus has involved rollers and trackways which support the probe, and thus suffers from the fact that accuracy is difficult if not impossible to achieve in constructing metallic trackways. Also, such elements are likely to contain residual stresses which result in error-inducing deformation when subjected to variations in ambient temperature.

When measuring systems using trackways have been designed to permit a probe to move selectively in mutually perpendicular directions, it has been customary to support the probe on an upper carriage which is movable on a lower carriage, the carriages being supported on rollers which move on perpendicular horizontal trackways. This arrangement introduces additional errors since any error in the position of the lower carriage is added to any error in the position of the upper carriage with respect to its support on the lower carriage. Compounding of errors thus results from this type of prior art device.

The present invention relates to a measuring instrument which avoids the aforementioned shortcomings of the prior art and harmonizes the qualities of accuracy, simplicity and economy of manufacture.

There are several features of the measuring instrument of this invention which render it superior to precision measuring instruments used heretofore. They are briefly summarized in the following paragraphs.

The instrument disclosed in this specification involves a granite body having a planar reference surface for supporting an article which is to be measured. A probe member is supported on the granite body by air bearings to permit movement of the probe into alignment with various portions of the article during the measuring procedure. The use of granite or similar naturally occurring stone materials is preferred since the material is hard and free of internal stresses, it is relatively dimensionally stable when subjected to temperature changes and it is capable of being ground and polished to an extremely high degree of accuracy. Furthermore, the availability of this material within a large range of sizes gives the instrument designer a great deal of freedom in selecting the size and shape of the base of the measuring apparatus.

Air bearings or "gas bearings" as they are sometimes described in this specification are known to the prior art. Broadly, this term encompasses any devices in which one article is supported on another, gravitationally or otherwise, and a thin film of gaseous fluid is introduced at the interface between the articles so that one article "floats" over the other without any frictional contact. The bearings disclosed in this specification and preferred for this apparatus include porous metallic air diffusing members which have planar outer surfaces lying adjacent to the supporting surface. Their use in supporting a probe on the work-supporting surface of the granite block is particularly advantageous for several reasons. Of course, the absence of frictional contact will avoid any abrasion of the granite during movement of the probe, thus permitting the granite to remain accurate and true even after extensive usage. Since the bearing rides on an area of the granite rather than on a point, its location will not be affected by the minute fissures which occur in the granite but will, instead, follow a path defined by the polished outer surface of the supporting block.

A particularly important advantage resulting from the use of air bearings in apparatus of the type disclosed herein is that they permit extremely accurate adjusting or "fine tuning" of the instrument by the regulation of the flow of gas to each bearing. Such regulation will, of course, affect the thickness of the gas film present at the bearing and the location of the probe with respect to the supporting surface. Once the air supply is adjusted, the thickness of the air film is unusually stable and remains within 3 to 5 millionths of an inch from its desired thickness. In the disclosed instrument, regulation of the gas flow may as well be used to affect the angularity of the probe and its movable supports with respect to the reference surface in order to achieve an unusually high degree of accuracy.

In another sense, this invention pertains to measuring apparatus in which a movable probe is supported in a manner so that it may be moved along mutually perpendicular paths, and in which each of these paths is related directly rather than indirectly to a given reference plane. There are provisions for indicating the position or displacement of the probe along each path. Such direct measurement avoids the error-compounding discussed above regarding prior art instruments.

The preferred and disclosed manner of relating both of the mutually perpendicular paths of movement of the probe directly to a reference surface is to have a probe supporting member which traverses an edge lying in the reference surface. The probe supporting member includes separate means which may be air bearings for (1) locating it in a position precisely with respect to the edge of the surface, i.e. laterally of the surface, and (2) locating it in a position precisely in a direction normal to the surface. The probe is movable with respect to the probe-supporting member in a direction normal to the surface. This mode of supporting the probe will permit separate and wholly independent readings of the probe's location laterally of the surface and normal to the surface.

In order to obtain measurement of an article along a third axis which is lateral to the reference surface and perpendicular to the measurements discussed above, the disclosed embodiment of the invention includes a work-supporting platform which is movable laterally with respect to the work supporting or reference surface and perpendicular to the paths of movement discussed above. It also is desirable to include a rotary table on the movable work-supporting platform which will give the apparatus the additional capability of making angular measurements. This also facilitates the positioning of articles with respect to the probe. A novel and preferred type of rotary table utilizing air bearings is discussed in a later portion of this specification.

A refinement of the error-isolation concept discussed above involves means for assuring that one of the paths of the probe, the path traversed as the probe moves along the probe supporting member, is accurately normal to the reference surface. THe disclosed instrument is therefore provided with means for adjusting the angularity between the probe supporting member and the reference surface. Preferably, this means includes plural gas bearings which may be regulated to arrive at the desired perpendicularity. The illustrated probe supporting member extends below the horizontal reference surface and has laterally facing air bearings at its lower portion to permit the necessary adjustment for angularity.

Further phases of this invention pertain to the nature of the probe members which are brought into alignment with portions of the workpiece during the measuring process. It is known that such probes may operate optically, electrically or by physical contact with the workpiece. In the presently described instrument, novel interchangeability between these three types of probes is achieved most conveniently by permanently securing an optical telescope probe to its supporting structure and providing electrical or contact probes with mountings which attach directly to the barrel of the optical probe so that the work-contacting point of the attached probe will lie precisely on the line-of-sight of the optical telescope.

A special purpose probe, also supported on the barrel of the optical telescope, gives the instrument a capability of locating the centers of apertures in a workpiece. Basically, this special purpose probe is mounted so it may become inclined from the line-of-sight of the telescope. Electronic devices indicate such inclination. A tapered plug at the extending end of this probe is inserted into an aperture in the workpiece and the telescope is moved until it is indicated that the probe is parallel to the line of sight. At this point, the location of the aperture in the workpiece may be taken directly from the read-out means which gives the location of the telescope.

As stated in a preceding portion of this specification, the capabilities of this instrument are enhanced by supporting the workpiece on a rotary table. When such a rotary table is supported on air bearings and when the rotary table is eccentrically loaded, there may be an inclination of the rotary table with respect to the work supporting or reference surface. This inclination may be eliminated by regulating the air flow to the supporting bearings; but, when the rotary table is rotated, an eccentric load which moves with respect to the bearings will result in another inclination of the rotary table. In order to avoid this difficulty, the present invention proposes to provide adjustable air bearings which rotate with the table and with any esscentric load located thereon, so that rotation will not affect the parallelism between the rotary table and the reference or work supporting surface.

Apparatus of the type described in this application requires means for accurately and positively moving the probe at a very low velocity, to permit it to become precisely aligned with the article being measured. For convenience, it is desirable to be able to move the probe at a high velocity when going a substantial distance from one position to another. This apparatus includes a probe-positioning system which utilizes a source of high pressure air and a source of low pressure air which are used to expel hydraulic fluid from a reservoir vessel to a double acting hydraulic motor. The probe-moving structure is attached to the output of the hydraulic motor. A metering valve is located in the liquid line between the reservoir and the hydraulic motor. Unusually slow movement of the probe is achieved when low pressure air is led to the reservoir vessel and the liquid metering valve is only slightly opened. The rapid movement results when high pressure is directed to the reservoir and the metering valve is fully opened. Details of this and other aspects of the invention will be described more fully in the description of the preferred embodiment.

THE DRAWINGS

The drawings in this specification illustrate but one type of basic machine for illustrative purposes only with the understanding that numerous variations thereto may be devised within the scope of the invention.

FIG. 2 is a plan view of the apparatus of FIG. 1 adding some details involving the means for supporting and moving certain elements of the apparatus;

FIG. 3 is a sectional view taken along the line 3—3 in FIG. 2;

FIG. 4 is a front elevation of the apparatus of FIG. 1, partially in section, showing additional details which have been omitted from FIG. 1;

FIG. 8 is a side elevation of an optical probe capable of use with this apparatus;

FIG. 9 is a view of a contact probe capable of use in this apparatus;

FIG. 10 is a view of an electrical probe for this apparatus;

FIG. 11 is a view of a probe adapted to determine the location of apertures in a workpiece;

FIG. 12 is a plan view of a housing for a typical air bearing;

FIG. 13 is a sectional view of a typical air bearing;

FIG. 20 is a view taken along the line 20—20 in FIG. 17 with views A, B and C showing the passages for high pressure air in the hydro-pneumatic valves at three different positions of the valve;

FIG. 21 is a view taken along the line 21—21 in FIG. 17 with views A, B and C showing the passages for low pressure air in the hydro-pneumatic valves at three different positions of the valve;

Figure 17:
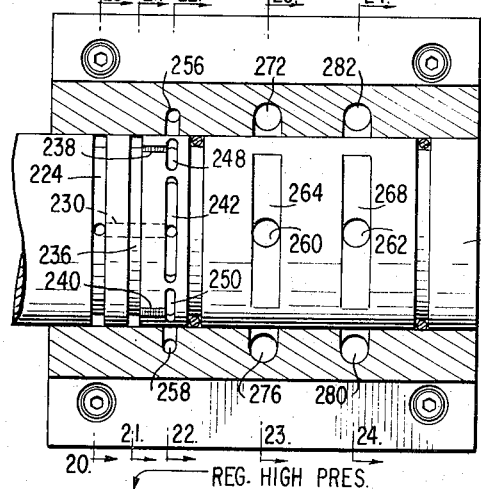
FIG. 17 is a sectional view of a valve in the hydro-pneumatic system taken along the lines 17—17 in FIG. 16.

FIG. 22 is a view taken along the line 22—22 in FIG. 17 with views A, B and C showing the passages for high and low pressure air in the hydro-pneumatic valves at three positions of the valve; and FIG. 23 and FIG. 24 are used taken respectively along the lines 23—23 and 24—24 in FIG. 17 with views A, B and C showing the hydraulic fluid passages in the hydro-pneumatic valve at three different positions.

DESCRIPTION OF THE PREFERRED EMBODIMENT

Figure 1:
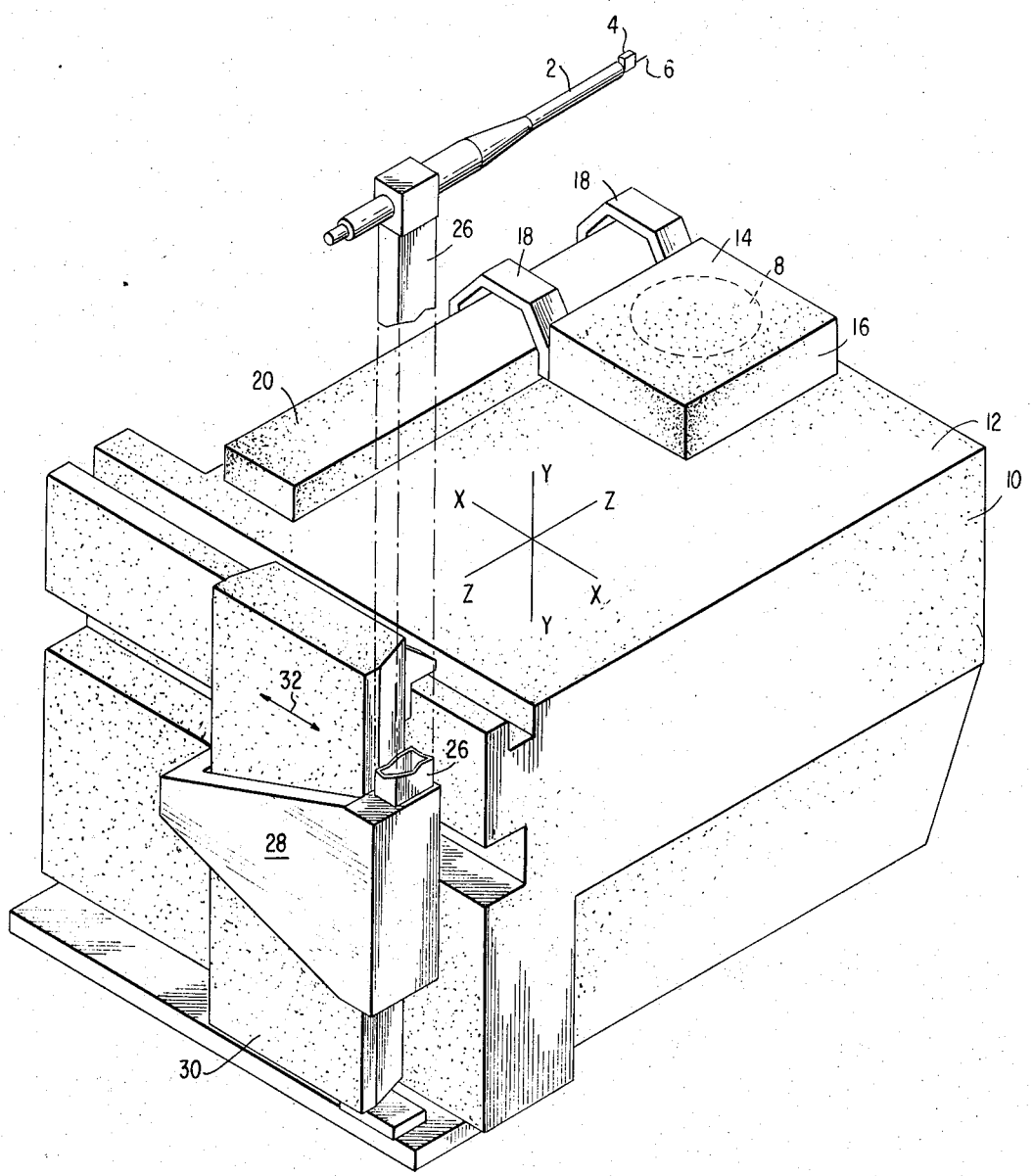
FIG. 1 is a perspective view of some of the principal elements of the apparatus capable of measuring distances along three mutually perpendicular axes.

The general principle of operation of the machine will be understood from FIG. 1 which shows the basic structural elements of the instrument in somewhat abbreviated form. A probe member 2 is provided with a sensing head 4 which has a tip portion 6 capable of being brought into contacting alignment with various portions of the article 8 which is to be measured. Relative movement between the probe member 2 and the article 8 may be produced along any of the X, Y or Z axes which are illustrated in FIG. 1.

The base of the machine is a large granite block 10 which has a horizontal upper surface 12 which is ground and polished to a high degree of accuracy to constitute the planar reference or work supporting surface. The article 8 which is to be measured is gravitationally supported on the upper surface 14 of a granite member 16 which is supported on the surface 12 by air bearings and is movable thereacross in a direction aligned with the Z axis. The location of the air bearings is indicated in broken lines at 15 in FIG. 2.

The member 16 is constrained for linear movement aligned with the Z axis by virtue of the members 18 which are attached to the member 16 and movable longitudinally along the stationary elongated guide member 20. As shown in FIG. 3, air bearings 22 and 24 are attached to the member 18 in order to provide for frictionless and non-abrasive movement of the members 18.

Relative movement between the probe 2 and the article 8 in directions aligned with the X and Y axes is a result of movement of the probe 2 itself. As indicated in FIG. 1, the probe is supported on a vertically extending post member 26 which is attached to and extends upwardly from a vertically movable carriage 28. The carriage 28 rides on the granite probe supporting member 30 in order to permit movement of the probe parallel to the Y axis and normal to the surface 12.

The probe supporting member 30 is supported on the granite block 10 and is movable in a direction indicated by the arrow 32 which is parallel to the X axis.

The basic construction shown in FIG. 1 obviously permits relative movement between the probe member 2 and the article 8 in all directions parallel to the X, Y and Z axes. All movable parts described thus far are supported and guided by air bearings which are particularly advantageous because they prevent abrasive deterioration of the granite surfaces, they maintain an air film of substantially constant thickness and they permit accurate calibration and adjustment of the equipment.

A typical air bearing especially well suited to this instrument is illustrated in FIGS. 12 and 13. It includes a housing 31 which has a recessed face and a plurality of intercommunicating grooves 33 which receive air from a conduit attached to the air inlet opening 35. As shown in FIG. 13, above the grooves and within the recessed face of the housing, there is a porous air-diffusing member 37. This member may be made of porous copper or bronze manufactured by conventional electro-polishing or reverse plating processes. It has a planr face 39 which rides parallel to an adjacent planar granite supporting surface during movement of the bearing.

Before arriving at the various bearings, the air preferably passes through a filter which removes solid particles and loose water, a dryer which reduced the moisture content to a degree at which the dew point is minus 20°F. and then through an oil filter.

In apparatus of this type, it is desirable to include means for positively moving the various elements to positions where the probe member 2 is aligned with various portions of the article 8 which is to be measured. In FIG. 2, it will be seen that the means for moving the member 16 along the surface 12 includes a double acting hydraulic ram 34 which is fixed with respect to the surface 12 and located on the upper surface of the guide member 20. The ram 34 has the usual reciprocable rod 36 which is connected to an endless band 38 by means of a clamp 40. The band 38 rides on pulleys 42 and 44 which are located toward opposite ends of the guide member 20. A larger pulley 46 is coaxial with and attached to the pulley 42 so that rotation of the pulley 42 will result in equal angular movement of the pulley 46. Another band 48 is reeved on the pulley 46 and also on a pulley 50 at the opposite end of the guide member 20. The outer band 48 is attached to a clamping member 52 which extends from a rod 54 interconnecting the members 18. As illustrated in FIG. 3, the hydraulic ram 34 and its rod 36 are nested within the smaller band 38 and located below the horizontal plane in which the upper and larger band 48 is located. The effect of this construction is that movement of the rod 36 of ram 34 through a given distance will result in movement of the members 18 and the attached granite block 16 through a greater distance. This increased movement is a direct result of the utilization of the concurrently movable pulleys 42 and 46 where the outer band 48 will move at a greater tangential velocity and through a greater tangential displacement than the inner band 38.

It will be recalled from the discussion of FIG. 1, that movement of the probe along the X axis is produced by moving the probe supporting member 30 laterally with respect to the reference surface 12. In FIGS. 2 and 4, it will be noted that a casting 56 is secured to a vertical face of the probe support member 30 in a position where it partially overlies the work support surface 12. On the underside of the casing, there are a pair of air bearings 58 and 60 which ride on the portion 12a of the work support surface. Some vertical support of the probe support member 30 is provided by an air bearing 62 at the lower end thereof which rides on a slightly inclined surface 64 which extends beyond the edge of the granite block 12. This air bearing 62 may be resiliently mounted and biased downwardly for vertical movement with respect to the probe support member 30, and it serves a stabilizing function to prevent outward displacement of the lower end of the probe support member 30.

The probe support member 30 is prevented from turning about vertical axes by a pair of air bearings 66 and 68 which ride on the substantially vertical sidewall of the granite block 12, and by a resiliently mounted and biased air bearing 70 which rides on the outer vertical face of the slot 71 which is cut in the upper surface 12 of the granite block 10.

Of course, in order to obtain highly accurate vertical measurements perpendicular to the surface 12 and parallel to the Y axis, it is essential that the longitudinal axis of the probe support member 30 be precisely perpendicular to the surface 12. In order to insure this perpendicularity, the apparatus has an air bearing 72 which, as shown in FIG. 4, is at the lower inside face of the probe support member 30. Control of the flow of air to the air bearing 72 will affect the spacing between the lower end of the probe support member 30 and the substantially vertical face 74 of the block 10. This enables a technician calibrating the machine to vary the setting of the regulator in the pneumatic conduits to the air bearing 72 until precise perpendicularity is produced between the probe support member 30 and the surface 12. This is a particularly desirable aspect of the invention in view of the fact that it is not possible to obtain perfect perpendicularity between the top surface 12, and the side surface 74 of the block 10.

The mechanism for moving the probe support member horizontally and parallel to the X axis is located within the cavity 76 in the vertical face 74 of the granite block 10. Essentially, it involves a double acting hydraulic ram and a pair of belts which are like those described above in connection with movement of the granite piece 16 along the Z axis. Like the previously-described construction, this provides a greater movement of the probe support member 30 than of the ram which produces its movement. The exact construction is not shown in this specification, but its location is shown in FIG. 4 where the vertical shaft 78, the concurrently movable pulleys 80 and 82 and the clamp 83 are shown. The clamp 83 is used, of course, to secure the outer belt which passes over the pulley 80 to the probe support member.

Vertical movement of the probe 2 is produced by moving the carriage 28 vertically along the probe support member 30. As shown in FIG. 2, the carriage 28 has air bearings 84 and 86 which ride on the outer vertical surface 88 of the probe support member 30. Air bearings 90 and 92 are attached to the carriage 28 and ride on the tapered surfaces 94 and 96 of the probe support member 30. From FIG. 4, it will be noticed that there are two sets of the bearings 92 and 86 since they are located on the larger side of the carriage 28.

The carriage 28 is moved vertically and parallel to the Y axis by the hydraulic ram 98 which is connected to the carriage 28 in the manner shown in FIG. 4. The hollow post 26 which is attached to the carriage 28 is located directly above and aligned with the axis of the ram 98. The lower end of the ram rests on a member 100 which is attached to and movable with the probe support member 30. At the upper portion of the ram, there is a vertically extending rod 102 which carries at its outer extremity a transverse member 104 from which a pair of arms 106 and 108 depend. At the lower end of the arms 106 and 108, there are outturned portions 110 and 112 which underlie and support the post member 26, the carriage 28 and the probe member 2. The hydraulic ram 98 is of the double acting type so that movement of its rod 102 in either direction will result in vertical movement of the carriage 28 and its appurtenances. This movement is guided very accurately by the precision-ground surfaces of the probe support member 30 over which the air bearings on the carriage 28 ride. The network for distributing air or other gas to the bearings includes various valves and pressure regulators which are used to calibrate and adjust the instrument. In the bearings which permit Z axis movement each of the bearings 15 may be regulated independently, while single regulators are used in the air supplies to both of the bearings 22 and to both bearings 24. In the bearing supports for the probe support member 30, single regulators are used for each of the sets of bearings 58–60 and 66–68. Air to each of the bearings 62, 72, 90 and 120 is regulated independently. The probe-supporting carriage 28 is movable on the independently regulated bearing 90 and on the concurrently regulated sets of bearings 84–86—86 and 92—92.

The preceding description indicates the manner in which the probe 2 is enabled to move relatively to the workpiece 8 along three mutually perpendicular axes. Of course, in measuring apparatus of this type, the distance of this movement is of ultimate importance, so accurate means must be provided for their measurement. In the illustrated and preferred embodiment, the distance measuring means is a digital read-out system known as the Inductosyn system which is marketed by Farrand Controls, Inc. of Vahalla, New York, and which is the subject of U.S. Pat. No. 2,799,835. Briefly, this type of read-out system involves an elongated electrically conductive scale and an electrically conductive slider which is movable along and closely adjacent to the scale. The inductive coupling between the scale and the slider, through the small air space therebetween, provides a direct read-out of the position of the slider without the interposition of error-introducing mechanical couplings or optical scales.

The drawings of this specification indicate in only a diagrammatic manner the locations of the scales and sliders used in the read-out system. In FIGS. 2 and 3, the scale for measuring along the Z axis is indicated at 114, while the mating and cooperating slider is mounted on the member 18 at 116. The X axis movement is indicated by the read-out of the scale 118 which is fixed on the surface 12 and the slider 120 which is cantilevered outwardly from the casting 56 on a member 122. Also shown in FIG. 2 are the scale 124 which extends vertically along the probe support member 30 and its cooperating slider 126 which is attached to the vertically movable carriage 28.

Apparatus of the disclosed type may be used with various types of probes capable of being brought into alignment with articles located on the work supporting surface 12. FIG. 8 shows an optical telescope which is useful in making measurements in the plane defined by the X and Y axes. Suitable telescopes are commercially available and may be of the type described in U.S. Pat. No. 2,909,964.

Another useful type of probe is one which senses physical contact with the article being measured. This type of device which is commercially available is shown in FIGS. 1 and 9 and involves an arm 128 which has a sensing tip 6 extending from a housing 132. The housing 132 contains means for sensing any movement of the arm 128 when the tip 6 is brought into contact with an article. It has been found to be particularly desirable to give a feeler-type probe such as the one illustrated in FIG. 9 the capability of being mounted directly on the optical telescope 134. As shown, this direct mounting is achieved by providing a barrel 136 on the support for the contact probe which is capable of fitting directly over the barrel of the telescope.

An alternative type of contact probe is shown in FIG. 10 wherein an electrically conductive member 138 is threadedly engaged within the end of the barrel of the telescope 134. The member 138 has a depending tip portion 140 which may be brought into contact with an electrically conductive article being measured. Suitable circuitry may be provided to determine when electrical contact is established between the tip 140 and a workpiece, at which point the location of the probe may be determined from the previously described read-out means in order to determine the dimensions of the article.

In both types of probes illustrated in FIGS. 9 and 10, there is a particular advantage enjoyed if the tips or contacting points 6 and 140 are directly aligned with the line of sight of the telescope. This facilitates initial positioning of the probe-supporting elements prior to attachment of the auxiliary probes illustrated in FIGS. 9 and 10. Initial positioning may be achieved by providing and attaching an illuminating light source at the objective eyepiece of the optical telescope to project a beam of light with crosshairs onto the article. The probe supporting elements may then be manipulated until the line of sight falls at the point where a measurement is to be taken. Then, the auxiliary probes illustrated in FIGS. 9 and 10 may be placed on the barrel of the telescope in order to take the final measurement or determine the final position of the workpiece.

In apparatus of the type described in this specification, there sometimes arises an occasion to determine the precise location of an aperture in a workpiece. In order to meet the requirements of such a situation, the probe illustrated in FIG. 11 may be used. This probe is telescopically fitted over the barrel of the optical telescope probe 134. It includes an elongated horizontal rod 142 which has a tapered plug 144 at its outer end. The plug 144 may be supported within the rod 142 by a cylindrical air bearing so that it may be interchanged with similar tapered plugs of different diameters. The rod 142 is connected to the base 146 of this probe by a universal joint 148 so that the rod may become displaced laterally from the line of sight of the optical telescope.

In order to determine the extent of deviation of the rod 142 from the telescope's line of sight, there is a housing 150 which contains a pair of gauges 152 and 154 which have their sensing feelers 156 and 157 resting directly on the telescoping barrel. Sensing feeler 156 contacts the side of the telescope barrel and detects any horizontal deviation of the rod 142 from the line of sight of the telescope. The sensing feeler 157 which lies against the upper surface of the telescope detects vertical deviations of the rod 142. Both gauges 152 and 154 are similar to the one shown at 4 in FIG. 1 and are commercially available from various sources. One suitable gauge is available under the designation TC-510-3 from the DoALL Company of Des Plaines, Ill. Such gauges 152 and 154 are calibrated so that they produce a zero reading in a conventional read-out amplifier when the rod 142 is directly aligned with the telescope barrel. Any vertical deviation of the rod 142 from the line of sight of the telescope is indicated in the read-out amplifier connected to the gauge 152 while in the horizontal deviation will be shown by the amplifier associated with the gauge 154.

When using the special probe of FIG. 11, an operator will manipulate the probe to a point where the tapered plug 144 is located in the bore of a workpiece. At this time, the read-out amplifiers for the gauges 152 and 154 may be expected to indicate that the rod 142 is not aligned with the telescope's line of sight. Additional movement is imparted to the probe-supporting elements until the read-out system for the gauges 152 and 154 indicates that the rod 142 is aligned with the telescope's line of sight. At that point, the operator may learn the precise location of the aperture from the read-out means of the machine which indicates the location of the probe along the X and Y axes.

Measuring instruments frequently are provided with rotary tables which facilitate manipulation of the work during the measuring process. The employment of air bearings in the present apparatus threatens to complicate or prohibit the use of a rotary table since an article being measured will usually have its center of gravity offset from the central axis of the rotary table. Thus, even when the surface of the rotary table is precisely parallel to the work supporting surface 12 any slight rotation of the table will change the loading of the bearings and thus destroy the parallelism.

Figure 5:
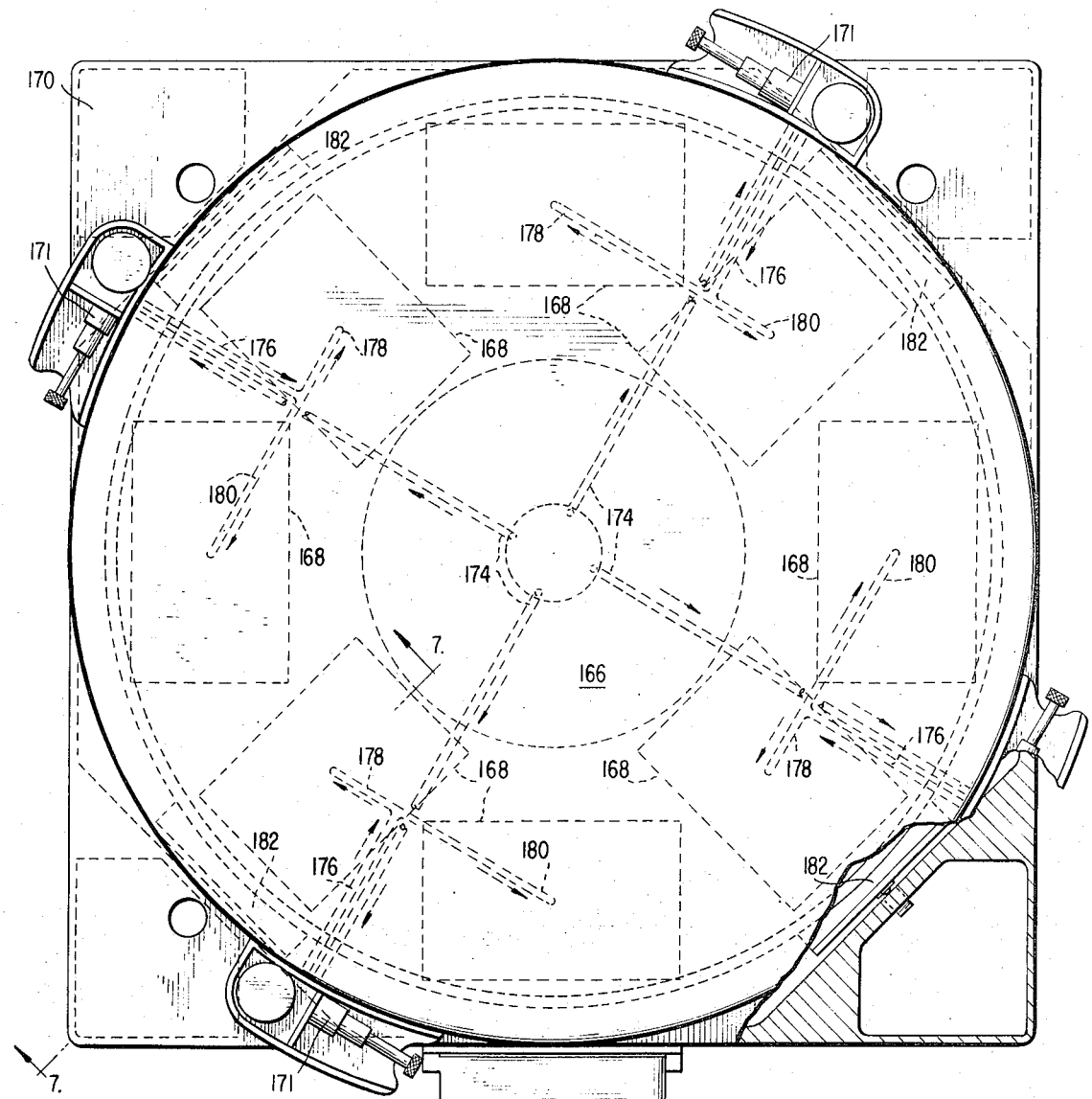
FIG. 5 is a plan view, partially in section, of a rotary table capable of use with the subject apparatus.
Figure 6:
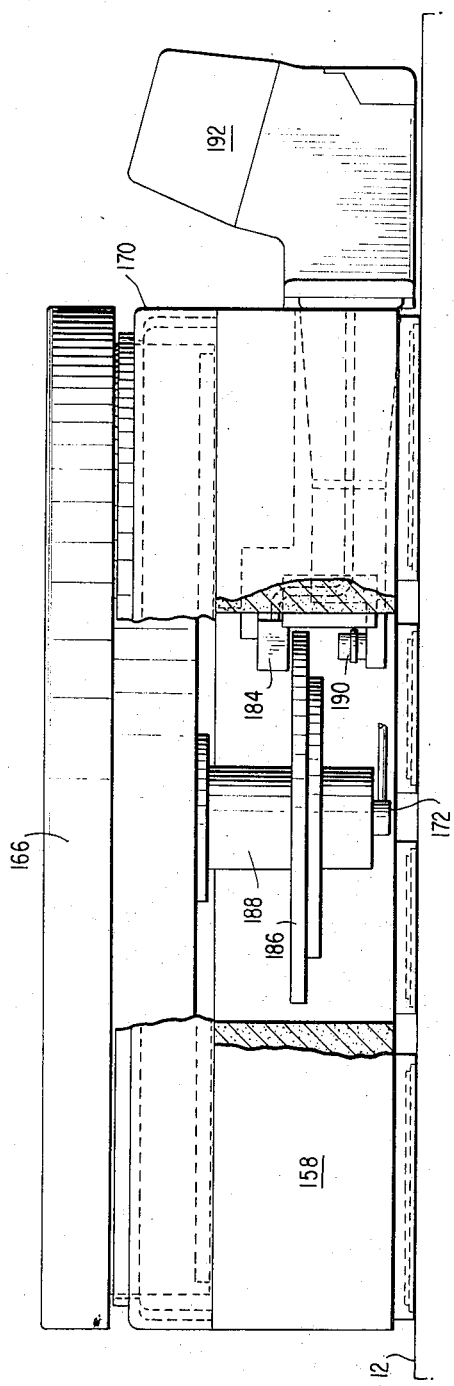
FIG. 6 is an elevational view, partially in section of the turntable of FIG. 5.
Figure 7:
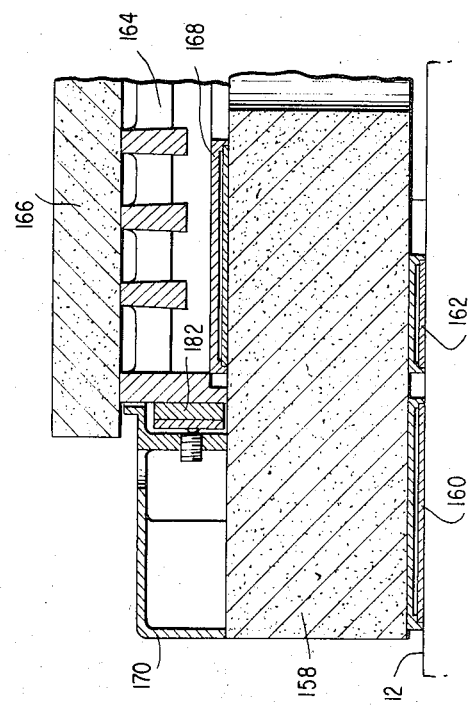
FIG. 7 is a sectional view taken along the line 7—7 in FIG. 5.

In order to avert the aforementioned difficulties with rotary tables, the construction illustrated in FIGS. 5, 6 and 7 has been devised. The basic principle of the rotary table of FIGS. 5, 6 and 7 is that the supporting air bearings are rotatable with the moving parts of the table so that the parallelism between the upper surface of the rotating table and the reference surface 12 will not be affected by rotation of the table.

Referring to FIG. 7 it will be seen that this apparatus involves basically a granite block 158 which is supported on the work supporting surface 12 by air bearings such as those designated 160 and 162. A rotatable carriage which includes a casting 164, a granite member 166 and supporting air bearings such as 168 are mounted on the upper surface of the granite piece 158. A casting 170 is attached to the upper surface of the granite piece 158 to restrain the carriage to rotational movement.

Referring to FIG. 5 it will be seen that the rotary table has directly on its undersurface a series of air bearings 168 which are equidistally spaced. On the peripheral wall of the granite piece 166, there are four hand-adjustable regulators 171 all of which receive air from the rotary coupling shown in FIG. 6 at 172. Air is transmitted from the coupling 172 through the tubes 174 to their respective regulators 171. The air output from each of the regulators is communicated by a tube 176 and branches 178 and 180 to a pair of adjacent air bearings 168. With such an arrangement, an operator may adjust one or more of the regulators 171 as necessary in order to be certain that the upper surface of the circular granite piece 166 is in a plane parallel to the work supporting surface 12. Once this parallel relation is obtained, the granite piece 166 and the circular casting 164 may be rotated without affecting this parallelism even if the circular table is loaded eccentrically. Of course, the foregoing assumes that the air supply has been cut-off to those bearings 160 and 162 which supported the block 158 on the granite block 10.

The preferred apparatus also employs bearings which provide lateral guiding support to the rotary table. These bearings 182 are mounted on the casting 170 and face radially inwardly of the casting 164 of the rotary structure. All four of the bearings 182 may receive air from a common regulator.

Figure 5A:
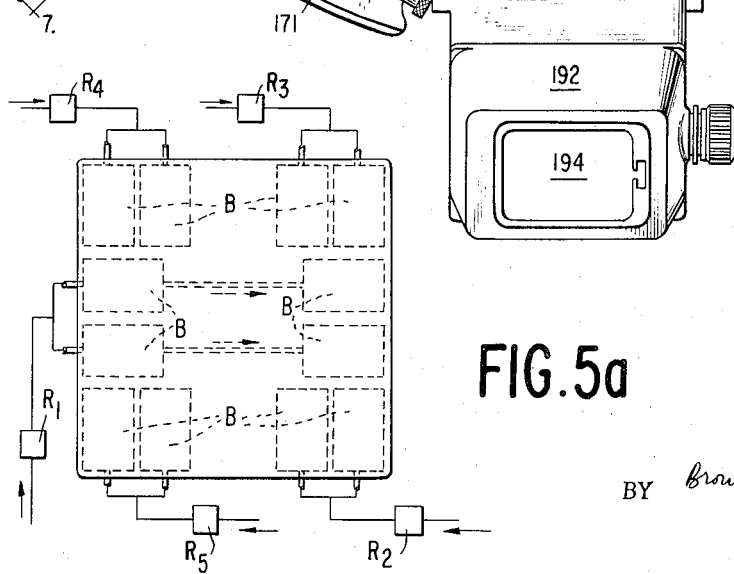
FIG. 5a is a diagrammatic representation of the location of the bearings used to support the base of the rotary table of FIG. 5.

A suitable arrangement of the bearings such as those shown in 160 and 162 in FIG. 7 for supporting the granite block 158 of the work supporting surface 12 is illustrated in FIG. 5a. This involves 12 bearings all of which are designated B. Four of these bearings receive their air from a regulator $R_1$ which is seldom adjusted during the course of operation of the machine. Other pairs of bearings receive their air from the regulators $R_2$, $R_3$, $R_4$ and $R_5$ which may be adjusted by an operator in order to insure that the upper surface of the rotary table 166 is parallel with the work supporting surface 12. The bearings shown in FIG. 5a will normally not be in operation during rotation of the rotaty table; however, their use and proper adjustment is essential to satisfactory operation when taking measurements along the Z axis. In such a case, movement of the granite piece 158 will be guided by members 18 and guide 20 in the manner shown in FIGS. 1 and 2.

The rotary table may be provided with any suitable read-out means which indicates its angular position. A commercially available optical system is illustrated. As shown in FIG. 6, there is a light source 184 located adjacent to the circular scale 186 which is attached to the post 188 and rotatable with the circular granite piece 166. An image of the disc scale 186 is received by lens 190 and transmitted optically to the housing 192 and a viewing screen 194 which is illustrated in FIG. 5. Of course, electronic read-out means may also be used in this apparatus.

It is particularly desirable in measuring apparatus of the type described to have means for positively moving the probe with respect to the article being measured. As set forth above, the preferred embodiment utilizes double acting hydraulic cylinders which produce the necessary relative movement.

The demands of such a hydraulic system are substantial since it must be capable of producing extremely slow and accurately controlled movement of the hydraulic rams to bring the probe into final alignment with the article. On other occasions, the equipment must be capable of producing relatively high velocity movement as when moving the probe from one side of a relatively large article to its other side.

The hydropneumatic system for producing the probe movement is illustrated in FIGS. 14–24. Briefly, the system involves three units, each of which is used for actuating one double-acting ram. Each unit includes a pair of liquid reservoirs which communicate with opposite sides of a related double-acting hydraulic ram. Also included in each unit is a valve which is used for controlling the flow of high pressure air, low pressure air and hydraulic fluid to each of the reservoirs.

Figure 14:
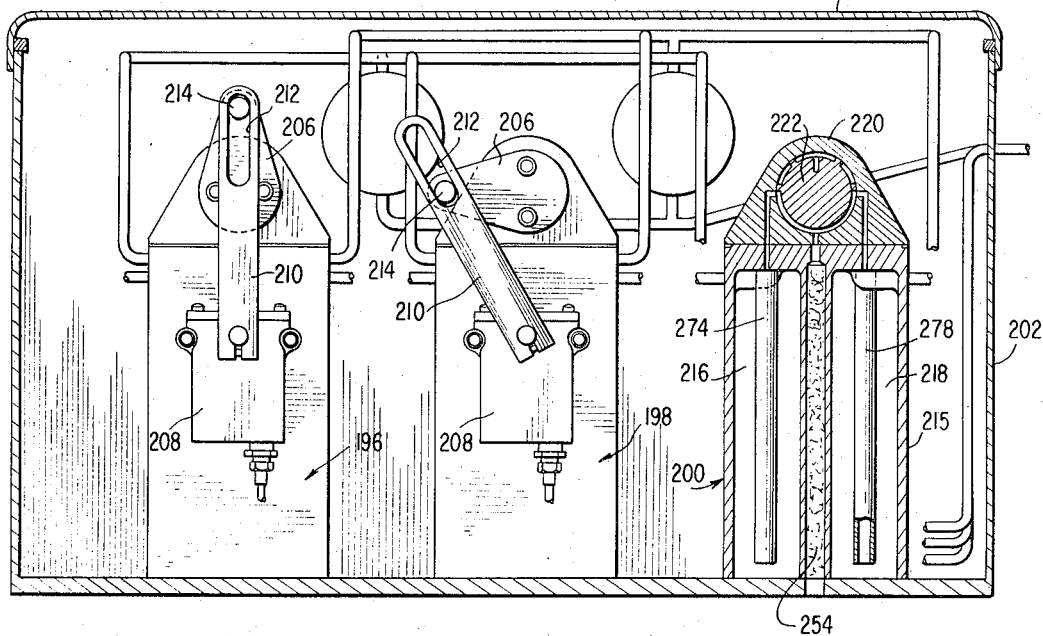
FIG. 14 is a elevational view, partially in section, of a portion of the hydro-pneumatic equipment which produces movement of a probe.
Figure 16:
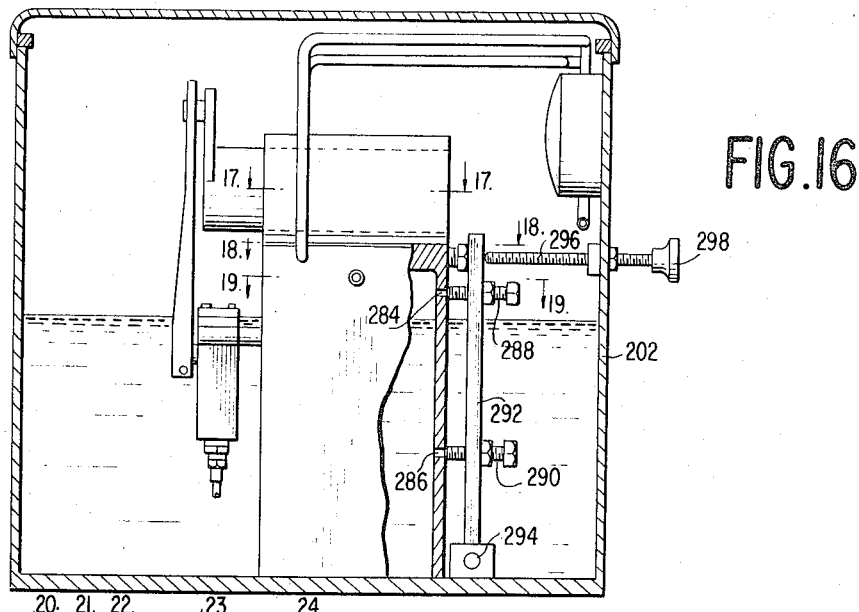
FIG. 16 is a partially sectional elevational view of the apparatus shown in FIG. 14.

Referring to FIG. 14, it will be noted that the three hydro-pneumatic units 196, 198 and 200 are located within a housing 202 which has a cover 204. The housing 202 is partially filled as shown in FIG. 16 with hydraulic fluid. It is located as close as is practicable to the double acting hydraulic rams, so that there is a minimum of loss of flow energy as the hydraulic fluid passes to and from the respective rams.

The units 196, 198 and 200 are identical, so identical reference numerals are used in describing each. The unit 196 may be used for controlling relative movement along the X axis; the unit 198 is for movement on the Y axis; and the unit 200 is utilized for movement along the Z axis.

Operation of any of the units 196, 198 and 200 is affected by producing movement in the lever 206 which is attached to the valve structure described below. In FIG. 14, it will be seen that movement of the lever 206 is produced by a receiver 208 of a conventional hydraulic actuator. Suitable actuators are commercially available and include a transmitter (not shown) which has a hand-operated lever. Hydraulic lines connect the transmitter with the receiver 208 so that any movement of the hand-operated lever will be reproduced in the lever 210 of the receiver 208. In some installations, it may be possible to dispense with the hydraulic actuators and the lever 206 may be operated directly by hand or by mechanical linkages.

In FIG. 14 it will be noted that the lever 210 has an elongated slot 212 which receives the pin 214 on the valve lever 206 so that movement of the actuator lever 210 through a given angle will produce movement of the valve lever 206 through a greater angle.

Figure 19:
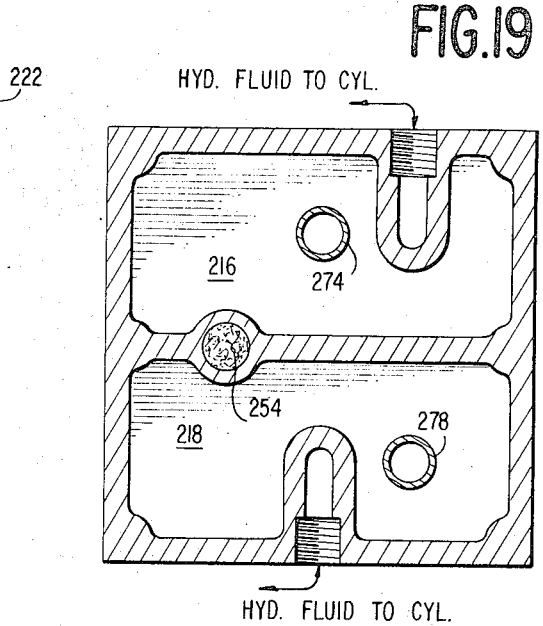
FIG. 19 is a view taken along the line 19—19 in FIG. 16.
Figure 18:
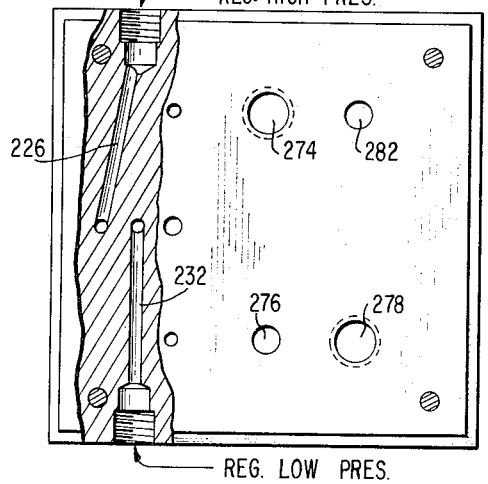
FIG. 18 is a view taken along the line 18—18 in FIG. 16.

FIG. 14 shows that the unit 200 includes a housing 215 which includes the two reservoirs 216 and 218 which are also shown in FIG. 19. A valve body 220 is secured directly to the upper surface of the reservoir housing 215. The valve plug 222 which is rotatable by the lever 206 is generally cylindrical in shape and located within the valve housing 220.

FIG. 17 shows that the cylindrical valve plug 222 includes five sections which are shown respectively in FIGS. 20–24. The three sections located at the left side in FIG. 17 are used for controlling the flow of air to the reservoirs, while the two sections to the right are used for hydraulic fluid.

Referring to FIG. 20, it will be noted that the first section of the valve plug 222 has a groove 224 which extends around its entire circumference. The peripheral wall of this section receives high pressure air through the passages 226 and 228 and discharges this air through an axial bore 230 which is best illustrated in FIG. 17.

Low pressure air enters the valve through passages 232 and 234 into the second section of the valve which is illustrated in FIG. 21. Again, there is a groove 236 which extends around the entire periphery of the valve plug 222. Axially extending grooves 238 and 240 which are also shown in FIG. 17 are used to carry air from the groove 236.

The section of the valve illustrated in FIG. 22 is that which controls the flow of high pressure and low pressure air to the reservoirs 216 and 218. This section of the valve includes a groove 242 which contains high pressure air received from the passage 230 described above. A pair of abutments 244 and 246 separate the groove 242 from the low pressure grooves 248 and 250, the latter receiving their air from the axial grooves 240 and 238. Another groove 252 is used for venting the unpressurized reservoir section in a manner described below. It communicates at all times with the vertically extending passage 254 which discharges to the atmosphere through the lower portion of the housing 202 as shown in FIG. 14.

From FIG. 22 it will be appreciated that rotation of the valve plug 222 will bring one of the grooves 248, 242 or 250 into alignment with one of the air passages 256 or 258. During the first phase of movement of the valve plug 222, low pressure air will be directed through one of the passages 256 and 258, while the opposite passage will be vented through the groove 252 and the passage 254. Further movements of the valve 222 will bring the high pressure groove 242 into communication with one of the passages 256 or 258, thus exerting a greater pressure on the fluid in one of the reservoirs sections in order to increase its discharge to the hydraulic ram.

The valve sections controlling the flow of hydraulic fluid are illustrated in FIGS. 23 and 24. Each includes a large diametrical bore 260, 262 and shallow circumferential grooves 264, 266, 268 and 270. The depth of the grooves 264, 266, 268 and 270 diminishes progressively from the maximum depth which exists adjacent the bores 260 or 262. In the valve section shown in FIG. 23, one side communicates with the passage 272 which leads to a tube 274, which has its lower end located below the liquid level in the reservoir 216. The other end of this valve section leads to a passage 276 which is in direct communication with one side of the hydraulic ram. In a like manner, the reservoir 218 receives and discharges hydraulic fluid through an immersion tube 278, passage 280, the valve, and then the passage 282 which leads to the opposite side of the hydraulic ram.

The resistance to fluid flow afforded by the valve section shown in FIGS. 23 and 24 is, of course, relatively high when the fluid must pass from the valve inlet to the valve outlet through the shallow grooves 264, 266, 268 and 270. The length of the passage through these grooves also will affect the resistance to fluid movement. When the central passages 260 or 262 become aligned with the fluid passages leading to the valve, the resistance to flow will be minimal so that fluid may move freely through the valve.

FIGS. 20–24 each include three views: the A view showing when the valve is in its entirely closed position, the B view showing when the valve is in a first intermediate position and the C view showing when the valve is in a further intermediate position, shortly before reaching the position at which maximum hydraulic fluid flow is obtained. It will be evident from FIGS. 20 and 21 that the valve sections shown there serve at all times to communicate high pressure air to the grooves 242 shown in FIG. 22, and low pressure air to the grooves 248 and 250 also shown in FIG. 22.

During the first stage of movement of the valve as shown in FIG. 22B, the low pressure air groove 248 is brought into communication with the passage 256 so that low pressure air enters the reservoir 216 and will tend to exhaust hydraulic fluid therefrom. Hydraulic fluid is urged upwardly through the tube 274 shown in FIG. 23A, passage 272 and then through a portion of the shallow groove 264, the bore 260, the shallow groove 266 and to the cylinder through the passage 276.

At the time that low pressure air is entering the reservoir 216 and liquid is being discharged from this reservoir at a very low rate, it is necessary to permit the fluid on the opposite side of the double-acting hydraulic ram to return to its respective reservoir 218. This return takes place through the valve element shown in FIG. 24 and specifically through the passage 282, the shallow groove 268, the central bore 262, the shallow groove 270, passage 280 and eventually through the tube 278 into the lower portion of reservoir 218. Entry of additional fluid into the substantially closed reservoir 218 will require that some air be vented. This takes place as shown in FIG. 22B where the air goes through the passage 258, groove 252 and downwardly through the passage 254 to the atmosphere.

Further movement of the valve as shown in the C portions of FIGS. 20–24 will result in increased fluid flow to and from the double-acting hydraulic ram. FIG. 22C shows that the high pressure air groove 242 is brought into alignment with passages 256 so that a greater expulsive force will be exerted on the fluid in the reservoir 216. Concurrently, the valves shown in FIGS. 23 and 24 have rotated to the point that the distance which the hydraulic fluid must travel through the shallow grooves 264, 266, 268 and 270 is substantially reduced to permit an increased flow. Of course, a slight further rotation of the valve from the position shown in FIGS. 23C and 24C will provide an even lesser resistance to the flow of hydraulic fluid.

The positions of the valve illustrated in FIGS. 20–24 show the sequence of events when the valve turns in a counter-clockwise direction. Of course, when the valve rotates in a clockwise direction, substantially the same thing happens in a reverse manner so that air under pressure will be admitted to the reservoir 218, the reservoir 216 will be vented and the hydraulic fluid will enter the ram from the reservoir 218 through the passage 278 and the other elements shown in FIG. 24.

A suitable alternative construction to that shown in FIGS. 20-24 is to provide a single cam-actuated valve which moves in response to rotation of the valve plug 222 and which sequentially admits high pressure and low pressure air to the respective reservoir sections.

Figure 15:
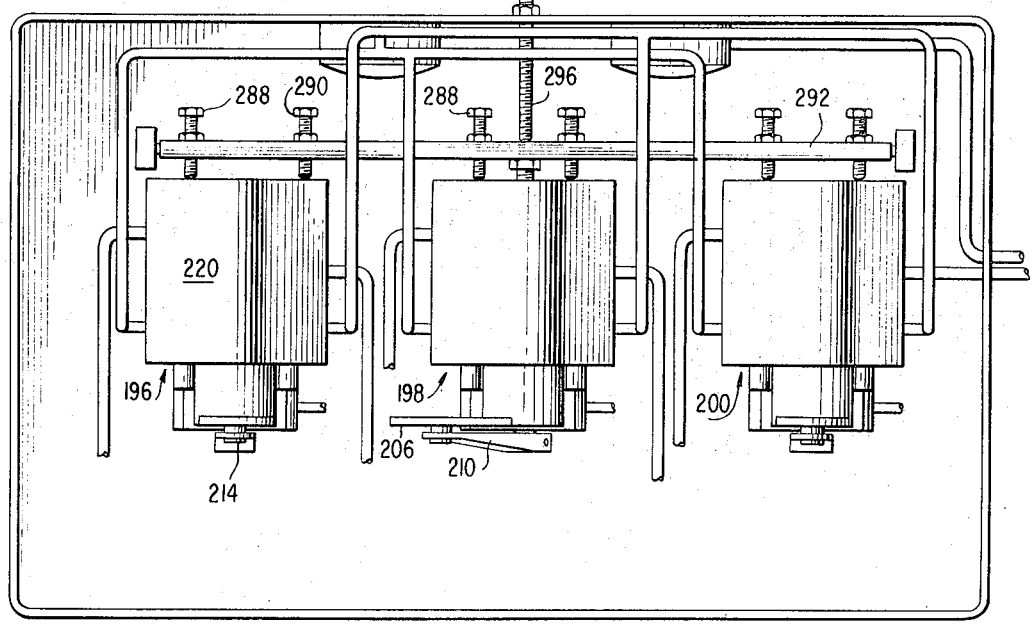
FIG. 15 is a plan view of the apparatus of FIGS. 14.

Replenishment of the hydraulic fluid in the units 196, 198 and 200 is accomplished by the construction shown in FIGS. 15 and 16. There, it will be noted that each of the reservoirs 216 and 218 in all units is provided with an upper aperture 284 located above the liquid level in the housing 202 and a lower aperture 286 located at a submerged position. The apertures 284 and 286 are normally maintained closed by the tip portions of the bolts 288 and 290 which are threadedly mounted in the plate member 292. The plate is pivotally mounted at 294 and normally held in the illustrated positions by a threaded rod 296 which extends through a wall of the housing 202 and carries a hand knob 298 at its outer end. Proper maintenance of the liquid level in the reservoirs is achieved simply by turning the hand knob 298 to retract the threaded rod 296 from the plate 292. This permits at least a partial opening of the apertures 284 and 286 so that the liquid level within the reservoir sections 216 and 218 may become equal to the level maintained within the housing 202. Preferably, the hydraulic rams are maintained in a mid-portion of their normal stroke during reestablishment of the liquid level in the units 196, 198 and 200.

In brief summary, it now will be appreciated that the invention described in the foregoing specification represents a significant departure from its predecessors in the art. The measuring instrument is relatively simple, highly accurate and quite adaptable to use in the measurement of articles having a wide variety of shapes, sizes and other physical characteristics. The various auxiliary feature of the invention including the bearing system and the hydro-pneumatic system are particularly useful in measuring instruments but may be employed in other environments. The removable probes, the aperture-locating probe and the rotary table are all devices which may add to the flexibility of the presently-disclosed and other types of measuring apparatus.

Numerous modifications and variations to be disclosed construction and within the spirit of the described inventions will occur to those working in the art. The nature of the inventions and their scope are not limited to the single embodiment described above.

I claim:

1. Measuring apparatus for determining a linear measurement along a given axis, comprising
    a body having a planar supporting surface,
    a probe supporting member movable parallel to said planar supporting surface,
    a probe on said probe supporting member being movable with said probe supporting member to positions aligned with an article to be measured,
    a plurality of spaced apart gas bearing means supporting said probe supporting member on said planar supporting surface,
    and a plurality of adjustable regulator means for adjusting the flow of gas to said gas bearing means to vary precisely the spacing normal to said planar supporting surface between said probe supporting member and said planar supporting surface; whereby the regulator means may be adjusted to affect the angularity between the probe supporting member and the planar supporting surface.

2. Measuring apparatus according to claim 1 in which said gas bearing means includes a porous gas-diffusing body with a planar bearing surface.

3. Measuring apparatus according to claim 2 in which said planar supporting surface is of stone, and said planar bearing surface is on the probe supporting member and is separated from the planar supporting surface by a thin film of gas under pressure.

4. A measuring instrument, comprising,
    an article-supporting table of material having an upper planar horizontal surface with a straight edge, said table having a generally vertically oriented side surface which is parallel to said edge,
    a probe support member having a substantial vertical dimension depending adjacent said edge to a point below said planar horizontal surface,
    upper gas bearing means supporting an upper portion of said probe support member for constrained horizontal straight line movement parallel and adjacent to said straight edge of the table;
    lower gas bearing means riding on said side surface beneath said planar horizontal surface for movement parallel to said straight edge of the table,
    adjustable regulator means for controlling gas leading to the lower bearing means to adjust the spacing between the lower portion of said probe support member and the side surface,
    a probe movable in a substantially vertical path on said probe support member, and
    means for indicating the displacement of said probe along said substantially vertical path.

5. A measuring instrument according to claim 4 in which each of said gas bearings includes a porous gas-diffusing body with a porous outer bearing surface.

6. A measuring instrument according to claim 4 in which said table is of stone.

7. A measuring instrument according to claim 6 in which said probe supporting member is of stone.

8. A rotary work supporting table capable of use in measuring apparatus, comprising
    a body having a planar surface for supporting said table;
    a rotatable member supported on said surface and being adapted to support an article, said rotatable member having at least three circumferentially spaced apart gas bearings located adjacent and parallel to said surface, said gas bearings being affixed to and rotatable with said rotatable member; and
    adjustable regulator means for individually controlling the pressure of gas to each of said gas bearings; whereby said table may be levelled precisely by adjustment of said regulator means, and its level orientation will not be affected by the rotation thereof.

9. A rotary work supporting table as described in claim 8 in which said rotatable member is a circular disc, a housing with a circular opening which rotatably receives said disc, gas passages in said housing leading to points immediately adjacent the edge of the circular disc, a plenum chamber and gas passages in said disc which communicate with at least one of the gas passages in said housing and individual gas passages leading from said plenum chamber to each of the gas bearings, said adjustable regulator means being located in said individual gas passages.

10. Measuring apparatus, comprising,
a probe supporting assembly movable in selected paths parallel to a given plane, a first probe extending from said assembly in a direction angularly oriented to said plane,
said first probe comprising an optical telescope having a line of sight movable with and fixed with respect to said assembly into alignment with selected portions of an article to be measured,
and a second probe mountable on said first probe, said second probe having an element with a sensing point for contacting an article to be measured, said sensing point lying precisely on the line of sight.

11. Measuring apparatus for determining a linear measurement along a given axis comprising
a body having a planar supporting surface,
a probe supporting structure movable parallel to said planar supporting surface,
a probe on said probe supporting structure being movable with said probe supporting structure to positions aligned with an article to be measured, said probe being movable on the probe supporting structure in a linear path which changes the distance between the probe and said planar supporting surface,
means for indicating the location of the probe along the linear path,
gas bearing means supporting said probe supporting structure on said planar supporting surface by a thin film of gas which maintains a spacing between the gas bearing means and the planar supporting surface,
and regulator means for adjusting the flow of gas to said gas bearing means to vary precisely the thickness of the film and thereby spacing normal to said planar supporting surface between said probe supporting structure and said planar supporting surface.

12. Measuring apparatus according to claim 11 having gas bearing means supporting said probe for movement on said probe supporting member.

13. Measuring apparatus according to claim 12 in which said probe supporting member is of stone.

14. The apparatus of claim 11 wherein the planar supporting surface has an area for supporting a workpiece which is being measured.

15. The apparatus of claim 14 having gas bearing means movably supporting a workpiece on the planar supporting surface.

16. The apparatus of claim 11 wherein the body having a planar supporting surface is made of stone.

17. The apparatus of claim 11 wherein the gas bearing for supporting the probe on the planar supporting surface includes a porous gas-diffusing body with a planar bearing surface, and means for forcing gas through the gas-diffusing body in a direction toward the planar supporting surface.

18. The apparatus of claim 17 wherein the body having a planar supporting surface is made of stone.

19. The apparatus of claim 11 having means for guiding the probe including means providing a second planar surface lying in a plane which intersects the plane of the planar supporting surface at a line of intersection and second gas bearing means fixed with respect to the aforesaid gas bearing means and riding on the second planar surface to guide the probe in a linear path which lies parallel to the line of intersection.

20. The apparatus of claim 19 having second regulator means for adjusting the flow of gas to the second bearing means.

21. A measuring instrument, comprising,
means providing a planar horizontal surface for supporting an article to be measured,
a probe support member riding on said planar horizontal surface, said probe support member being constrained for movement along a horizontal straight line path,
a probe member on said probe support member which is horizontally movable with said probe support member into alignment with portions of an article on said planar horizontal surface, and
first means for indicating the displacement of said probe support member along its straight line path,
an expansible chamber device operatively connected to one of said members for positively and accurately locating said probe member, and a system for metering controlled amounts of fluid to said expansible chamber device, said system comprising the following elements:
a. a substantially air-tight vessel adapted to be partially filled with hydraulic fluid;
b. a source of pressurized fluid in communication with the interior of said vessel and being capable of forcing hydraulic fluid from said vessel;
c. a first valve in the flow path between said source of pressurized fluid and said vessel;
d. a passage for hydraulic fluid leading from said vessel to the expansible chamber device;
e. a metering valve in said passage, and
f. means connecting said first valve and said metering valve for simultaneous movement.

22. Measuring apparatus comprising,
means providing a planar supporting surface for supporting an article to be measured,
a probe support member constrained for movement in a first straight line path generally parallel to said plnar surface,
gas bearing means supporting said probe support member for movement parallel to said planar supporting surface,
a probe on said probe support member which is movable with said probe support member into alignment with an article on said planar supporting surface whereby a first dimension of an article may be determined from the relative movement between said probe support member and said article,
means supporting said probe for movement on the probe support member in a second straight line path which is substantially vertical and lies perpendicular to the planar supporting surface whereby movement of the probe along the second straight line path permits its alignment with an article on said planar supporting surface whereby a second dimension of an article may be determined from the relative movement between said probe and said probe support member,
means for indicating the displacement of said probe support member along its first straight line path, and
means for indicating the displacement of said probe along its second straight line path, said probe extending from said probe support member in a direction angularly related to said straight line paths, said probe constituting an optical telescope having a line of sight movable with and fixed with respect to the means supporting the probe, and a second probe suitable on the optical telescope, said second probe having an element with a sensing point for contacting an article to be measured, said sensing point lying precisely on the line of sight.

23. A measuring instrument, comprising, means providing a planar horizontal surface for supporting an article to be measured, a probe support member having gas bearing means riding on said planar horizontal surface, said probe support member being constrained for movement along a horizontal straight line path, a probe member on said probe support member which is horizontally movable with said probe support member into alignment with portions of an article on said planar horizontal surface, and first means for indicating the displacement of said probe support member along its straight line path, a rotatable platform means rotatable about a vertical axis and having an upper article-supporting surface generally parallel to said planar horizontal surface, at least three gas bearings affixed to the underside of and rotatable with said platform means, means providing a source of gas under pressure, conduit means for delivering gas under pressure to the gas bearings, said gas bearings being circumferentially spaced with respect to each other, adjustable regulator means for individually controlling the pressure of gas to each of said gas bearings; whereby said platform means may be levelled precisely by adjustment of said regulator means, and its horizontal orientation will not be affected by the rotation thereof.

24. A measuring instrument, comprising, means providing a planar article supporting surface and a guiding surface lying in intersecting planes, a probe support member having gas bearing means riding on both of said surfaces for constrained movement parallel to an intersection of said planes, a probe supported on and movable with said probe support member in a first path parallel to said edge, said probe extending over said supporting surface from said probe support member and being movable on said probe support member in a second path generally normal to said surface whereby the probe may be moved into alignment with selected portions of an article to be measured, means for indicating the position of said probe along its path of movement, gas bearings interposed between said probe and said probe support member, and means for adjusting the angularity between the probe support member and the article supporting surface, said means for adjusting including an adjustable regulator means for controlling gas leading to at least one said bearing.

25. A measuring instrument, comprising, means providing a planar article supporting surface and a guiding surface lying in intersecting planes, a probe support member having gas bearing means riding on both of said surfaces for constrained movement parallel to an intersection of said planes, a probe supported on and movable with said probe support member in a first path parallel to said edge, said probe extending over said supporting surface from said probe support member and being movable on said probe support member in a second path generally normal to said surface whereby the probe may be moved into alignment with selected portions of an article to be measured, means for indicating the position of said probe along its path of movement, and means for adjusting the angularity between said probe support member and said article supporting surface, further gas bearing means disposed between said probe and probe support member, each of said gas bearing means having a porous gas-diffusing body with an outer bearing surface.

26. A measuring instrument according to claim 25 in which said planar article supporting surface and said probe support member are of stone.

* * * * *